United States Patent [19]

Röttger

[11] Patent Number: 4,527,284
[45] Date of Patent: Jul. 2, 1985

[54] ADJACENT RADIO CELLS PAGING CHANNEL CHAINING SYSTEM

[75] Inventor: Klaus Röttger, Munich, Fed. Rep. of Germany

[73] Assignee: Siemens Aktiengesellschaft, Berlin and Munich, Fed. Rep. of Germany

[21] Appl. No.: 452,310

[22] Filed: Dec. 22, 1982

[30] Foreign Application Priority Data

Jan. 14, 1982 [DE] Fed. Rep. of Germany ....... 3200965

[51] Int. Cl.³ .......................... H04Q 7/02; H04B 7/76
[52] U.S. Cl. ........................ 455/33; 455/56; 455/62
[58] Field of Search ............... 455/33, 54, 56, 62; 179/2 EB

[56] References Cited

U.S. PATENT DOCUMENTS 3,539,924 11/1970 Daskalakis ........................ 455/54
3,913,017 10/1975 Imaseki ............................. 455/33
4,392,242  7/1983 Kai .................................. 455/56

FOREIGN PATENT DOCUMENTS 0037070 10/1981 European Pat. Off. ............ 455/33

Primary Examiner—Marc E. Bookbinder
Attorney, Agent, or Firm—Hill, Van Santen, Steadman & Simpson

[57] ABSTRACT

The free transmission capacity of one or more paging channels within a radio cell is employed in order to transmit organization specifications concerning the paging channel frequencies employed in the neighboring radio cells. The appertaining mobile radio station carries out level comparison measurements at suitable chronological intervals on the specific paging channel frequencies for the purpose of its potentially necessary reassignment to a neighboring radio cell. A reassignment of the appertaining mobile radio station to the corresponding neighboring radio cell occurs when a better radio connection quality exists on one of the neighboring radio cell paging channels.

8 Claims, 3 Drawing Figures

ADJACENT RADIO CELLS PAGING CHANNEL CHAINING SYSTEM

BACKGROUND OF THE INVENTION

1. Field of the Invention

The present invention relates to mobile radio systems, and more particularly to cellular mobile radio systems.

Due to the mobility of mobile radio stations, the assignment to a radio cell in cellular radio networks, particularly mobile communication networks, is not fixed but, rather, must be matched to the respective conditions depending upon location and broadcast conditions, i.e. corresponding reassignments are necessary. When these reassignments are carried out by the mobile radio stations, then the radio frequencies of the paging channels of the neighboring radio cells coming into consideration must be known for comparative level measurements in order to be able to determine the neighboring radio cell paging channel to be classified highest in terms of quality and, therefore, to also be able to determine that neighboring radio cell to which, if necessary, the reassignment is to occur. Due to fluctuations of field strength, such measurements must be able to repeatedly executed and at short time intervals.

2. Description of the Prior Art

A proposed method which employs a network-wide information channel for the above purpose has the disadvantage that the mobile radio station must already be situated in or in the direct proximity of the corresponding radio cell so that the transmitted information can be received, since pure level measurements do not suffice.

A further disadvantage is that a constant synchronization with the network-wide information cycle is required for reassignments and the full information cycle must always be received since the network-wide information cycle cannot generally take the respective local neighborhood conditions into consideration. This operating mode is not optimal since, for example, it is not possible to be able to undertake the load distribution to the individual paging channels of one radio cell and, in particular, in such a manner that mobile radio stations coming from different neighboring radio cells employ correspondingly-assigned paging channels.

SUMMARY OF THE INVENTION

The object of the present invention, therefore, is to provide a new neighboring radio cell/paging channel/chaining system which permits the local conditions to be taken into consideration, which guarantees a high degree of flexibility in view of changes in the network, and which can employ different, load-dependent control mechanisms.

The invention is based on the perception that a reassignment can and should occur only to a directly-adjacent radio cell in all cases.

According to the present invention, the above object is achieved by way of a neighboring radio cell/paging channel/chaining system for cellular radio networks, particularly mobile communication networks, which is characterized in that the free transmission capacity of one or a plurality of paging channels within one radio cell is employed to emit information concerning paging channel frequencies employed in the neighboring radio cells. An appertaining mobile radio station executes level comparison measurements as suitable chronological spacings on the specified paging channel frequencies for the purpose of its potentially necessary reassignment to a neighboring radio cell. A reassignment of the appertaining mobile radio station to the corresponding radio cell occurs when a radio connection quality exists on one of the neighboring radio cell paging channels.

The neighboring radio cell/paging channe/chaining system of the present invention offers the advantage that a high degree of flexibility is provided in view of changes to be carried out in the network, that an optimum usage factor of the paging channels is provided, that a time-saving and uncomplicated operating mode is enabled because of the decentralized organization, and that a more involved, network-wide information channel can be omitted.

BRIEF DESCRIPTION OF THE DRAWING

Other objects, features and advantages of the invention, its organization, construction and operation will be best understood from the following detailed description taken in conjunction with the accompanying drawing on which.

DESCRIPTION OF THE PREFERRED EMBODIMENTS

Figure 1:
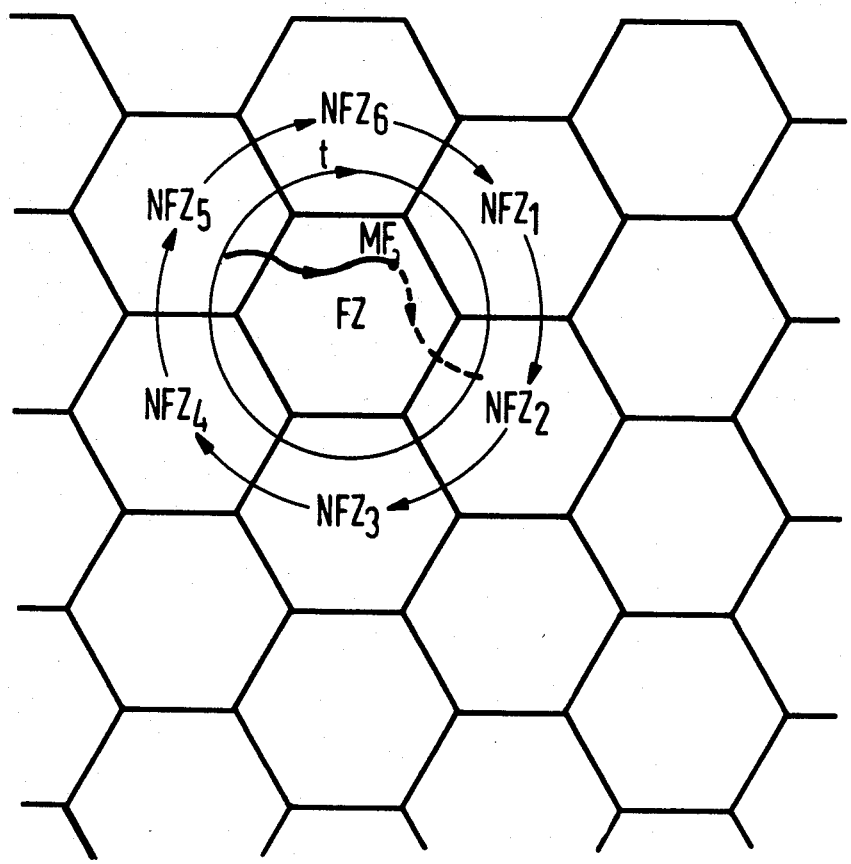
FIG. 1 is a schematic illustration of a cellular radio network.
Figure 2:
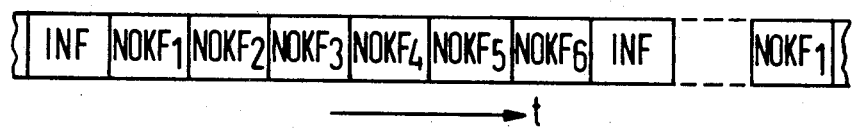
FIG. 2 is a schematic representaion of neighboring radio cell paging channel frequencies and information blocks for individual messages, illustrated with respect to time t.
Figure 3:
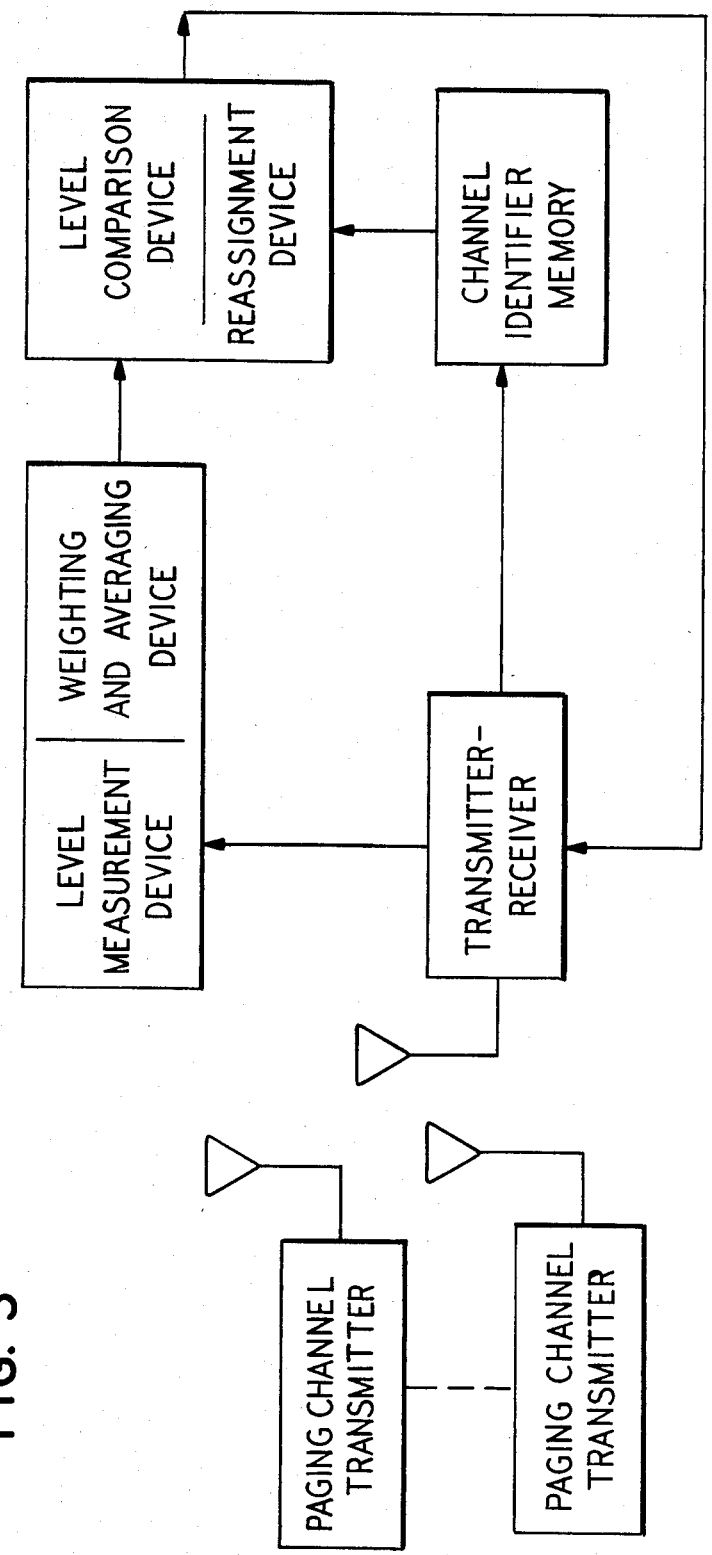
FIG. 3 is a block diagram of a system constructed in accordance with the present invention.

Referring to the drawings, FIGS. 1 and 3 schematically illustrate a known symbolic representation of a cellular network structure comprising a radio cell FZ and neighboring radio cells $NFZ_1$, $NFZ_2$ . . . $NFZ_6$ surrounding the radio cell FZ and a corresponding block diagram of a system constructed and operating in accordance with the present invention. FIG. 2 illustrates a chaining cycle having specifications concerning the neighboring radio cell paging channel frequencies $NOKF_1$ . . . $NOKF_6$ and information blocks for individual messages INF and FIG. 3 illustrates in block diagram form the fixed and mobile station equipment for implementing the invention. A mobile radio subscriber, for example, a service vehicle equipped with a mobile radio station MF, moves in the radio cell FZ as indicated by a solid line and further as indicated by a broken line, each having arrows designating the direction of travel, the lines indicating movement of the mobile radio station MF from the radio cell $NFZ_5$ into the radio cell FZ over a path which comes near the adjacent neighboring cells $NFZ_1$ and $NFZ_2$ and finally entering the cell $NFZ_2$. Provided for the new neighboring radio cell paging channel chaining system in accordance with the objects of the present invention is that the free transmission capacity of one or more paging channels within the radio cell FZ is employed to emit information concerning the paging channel frequencies employed in the neighboring radio cells $NFZ_1$ . . . $NFZ_6$.

As already explained, the invention proceeds from the perception that a reassignment in the case the mobile radio station MF moves from the radio cell FZ into one of the neighboring cells, for example the radio cell $NFZ_2$, can occur in all cases only for a change of location to a directly-adjacent radio cell. At that time, appertaining mobile radio station MF carries out level comparison measurements at suitable chronological intervals on the specified paging channel frequencies for the purpose of its potentially-necessary reassignments to a neighboring radio cell, to a neighboring radio cell $NFZ_2$ in the illustrated example. When a better radio connection quality exists on one of the appertaining neighboring radio cell paging channels, the reassignment of the mobile radio station MF to the corresponding neighboring radio cell occurs, namely to the cell $NFZ_2$ in the present case.

Thereby, the information concerning the paging channel frequencies which are made to the mobile radio station MF occur in a cycle. Advantageously, this cycle corresponds to the local geographical locations of the radio cells, in particular, the locations of the neighboring cells $NFZ_1 \ldots NFZ_6$ surrounding the appertaining radio cell FZ.

Advantageously, level measurements are executed by the mobile radio station MF for each neighboring radio cell frequency a plurality of times. The level measurements are then averaged to find the best radio connection. A reassignment to the appertaining neighboring radio cell, namely the radio cell $NFZ_2$, occurs when the radio connection perceived to the qualitatively the best exists with the radio base station servicing the radio cell. Also, advantageously, greater weighting occurs for averaging the measured results which were most recently received than applies to the measured results which were obtained at earlier times.

According to an advantageous further feature of the invention, it is provided that, given the use of a plurality of paging channels within the radio cell FZ, various paging channels of the radio cells FZ are transmitted by the neighboring radio cells $NFZ_1 \ldots NFZ_6$. Dynamically, depending upon its transmission load.

It is also provided, according to the present invention, that the paging channel identifiers of the assigned radio cell FZ and of the neighboring radio cells $NFZ_1 \ldots NFZ_6$ are stored in the mobile radio station MF. In case a reactivation of the mobile radio station MF occurs after an operating pause or the like, the stored information is employed to undertake an initial assignment in that level measurements are executed on the paging channel frequencies corresponding to the stored identifiers. To this end, the paging channel frequency of the paging channel of the most recently assigned radio cell is employed as an orientation value.

Although I have described my invention with reference to a preferred embodiment thereof, many changes and modifications of the invention may be apparent to those skilled in the art without departing from the spirit and scope of the invention. I therefore intend to include within the patent warranted hereon all such changes and modifications as may reasonably and properly be included within the scope of my contribution to the art.

I claim:

1. A neighboring radio cell paging channel chaining system for cellular mobile radio networks having a plurality of adjacent radio cells and at least one mobile station, and in which paging channels have free transmission capacity and respective specified frequencies, comprising:

first means in each radio cell for transmitting, in the free transmission capacity of at least one paging channel, paging channel frequency identifiers of the paging channels of the adjacent neighboring radio cells;

second means in the mobile radio station operable to carry out level measurements at chronological intervals on the specified paging channel frequencies; and third means in the mobile radio station operable to compare the measured levels with the level of the paging channel being employed by the mobile radio station and reassign the mobile radio station to a neighboring radio cell when the paging channel of the neighboring radio cell has a better quality of radio connection than the presently assigned radio cell.

2. The system of claim 1, wherein:
said first means comprises means for cyclically transmitting the paging channel frequency identifiers.

3. The system of claim 1, wherein:
said first means comprises means for cyclically transmitting the paging channel frequency identifiers in accordance with the locations of the adjacent neighboring radio cells about the appertaining radio cell.

4. The system of claim 1, wherein:
said second means comprises means for carrying out a plurality of level measurements for each paging channel and means for averaging the same; and
said third means comprises means operable to reassign the mobile radio station to that neighboring radio cell whose paging channel has the highest average quality of radio connection.

5. The system of claim 4, wherein:
said second means further comprises means for weighting the results of level measurement for averaging with a greater weighting for the more recent level measurement results.

6. The system of claim 1, in which the appertaining radio cell has a plurality of paging channels and further comprising:
means in the neighboring radio cells for transmitting the different paging channels.

7. The system of claim 1, in which the appertaining radio cell has a plurality of paging channels, and further comprising:
means in the neighboring radio cells for transmitting the different paging channels in dependence on the transmission load of the appertaining radio cell.

8. The system of claim 1, and further comprising:
fourth means in the mobile radio station for storing the paging channel identifiers of the appertaining radio cell servicing the mobile radio station and of the neighboring radio cells in response to deactivation of the mobile radio station; and
fifth means connected to said fourth means and operable to carry out an initial radio cell assignment in response to reactivation of the mobile station on the basis of the most recently used paging channel and the stored identifiers.

* * * * *